(12) United States Patent
Kuesel et al.

(10) Patent No.: US 11,375,298 B2
(45) Date of Patent: Jun. 28, 2022

(54) ANTENNA, IN PARTICULAR MOBILE PHONE ANTENNA

(71) Applicant: Telefonaktiebolaget LM Ericsson (publ), Stockholm (SE)

(72) Inventors: Volker Kuesel, Rosenheim (DE); Helmut Muehlbauer, Berlin (DE); Stefan Reichelt, Egerer (DE); Eckart Stuible, Brannenburg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 283 days.

(21) Appl. No.: 16/486,822

(22) PCT Filed: Feb. 16, 2018

(86) PCT No.: PCT/EP2018/053906
§ 371 (c)(1),
(2) Date: Aug. 16, 2019

(87) PCT Pub. No.: WO2018/149976
PCT Pub. Date: Aug. 23, 2018

(65) Prior Publication Data
US 2020/0007962 A1    Jan. 2, 2020

(30) Foreign Application Priority Data

Feb. 16, 2017   (DE) .......................... 102017001543.0

(51) Int. Cl.
*H04Q 9/00*      (2006.01)
*H01Q 1/24*      (2006.01)
*H01Q 1/12*      (2006.01)

(52) U.S. Cl.
CPC ............... *H04Q 9/00* (2013.01); *H01Q 1/246* (2013.01); *H01Q 1/1228* (2013.01); *H04Q 2209/826* (2013.01)

(58) Field of Classification Search
CPC .... H04Q 9/00; H04Q 2209/826; H01Q 1/246; H01Q 1/1228
See application file for complete search history.

(56) References Cited

U.S. PATENT DOCUMENTS 7,830,307 B2 *  11/2010  Asbridge, Jr. ....... H01Q 21/061
                                                342/360
8,354,959 B2 *   1/2013  Ahlberg ................ H01Q 3/005
                                                342/372
(Continued)

FOREIGN PATENT DOCUMENTS

CN      106325239 A     1/2017
CN      205879191 U     1/2017
(Continued)

OTHER PUBLICATIONS

Third Office Action for Chinese Patent Application No. 201880012513.0, dated Nov. 10, 2021, 22 pages.

(Continued)

*Primary Examiner* — Amine Benlagsir
(74) *Attorney, Agent, or Firm* — Withrow & Terranova, PLLC

(57) ABSTRACT

The present invention relates to an antenna, in particular a mobile phone antenna, in particular for a mobile radio base station, having at least one emitter, a data acquisition unit, a memory and having at least one sensor for detecting a mechanical and/or electrical and/or thermal stress of the antenna, wherein the data acquisition unit aquires measurement data of the at least one sensor and temporarily stores them in the memory. It is provided here that the data acquisition unit generates data packets based on a plurality of measurement data stored in the memory and transmits them to an external data base.

15 Claims, 4 Drawing Sheets

(56) References Cited

U.S. PATENT DOCUMENTS

Figure 1:
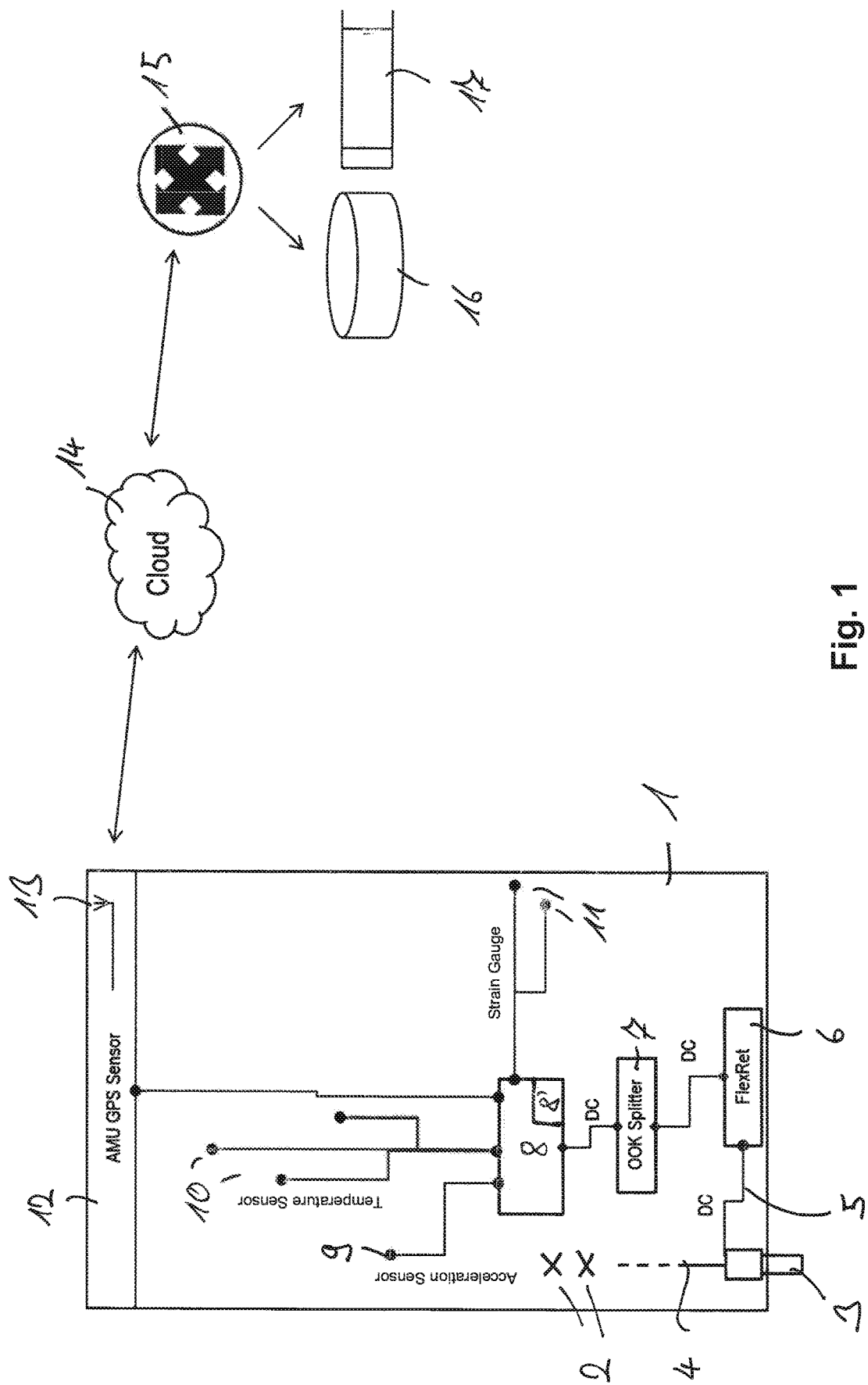

| | | |
|---|---|---|
| 8,423,201 B2 | 4/2013 | Burdette et al. |
| 8,676,266 B2 | 3/2014 | Kim |
| 8,896,497 B1 | 11/2014 | Kullman et al. |
| 9,046,601 B2 | 6/2015 | Le Sage |
| 9,177,184 B2 | 11/2015 | Prassberger et al. |
| 9,246,559 B2 | 1/2016 | Tarlazzi et al. |
| 9,276,329 B2 | 3/2016 | Jones et al. |
| 9,306,278 B2 | 4/2016 | Lever et al. |
| 9,332,441 B2 | 5/2016 | Brisebois et al. |
| 2002/0193144 A1 | 12/2002 | Belski et al. |
| 2003/0162539 A1 | 8/2003 | Fiut et al. |
| 2006/0145884 A1 | 7/2006 | Graham et al. |
| 2007/0229378 A1 | 10/2007 | Clark |
| 2010/0164833 A1* | 7/2010 | Dalmazzo .............. H01Q 1/246 343/894 |
| 2010/0278086 A1* | 11/2010 | Pochiraju ............. H04L 67/125 370/310 |
| 2012/0115548 A1* | 5/2012 | Shimizu ................. H01Q 21/26 455/562.1 |
| 2013/0005403 A1* | 1/2013 | Kuwahara ............. H04W 48/10 455/561 |
| 2013/0127666 A1 | 5/2013 | Zhang et al. |
| 2013/0265919 A1 | 10/2013 | Pochiraju et al. |
| 2013/0328716 A1* | 12/2013 | Le Sage ................ H01Q 1/246 342/357.36 |
| 2014/0242930 A1 | 8/2014 | Barker et al. |
| 2014/0306007 A1* | 10/2014 | Prassberger ..... G06K 19/07773 235/439 |
| 2015/0034785 A1 | 2/2015 | Xiao et al. |
| 2015/0189528 A1* | 7/2015 | Carbajal .............. H04W 24/08 370/252 |
| 2015/0229426 A1* | 8/2015 | Yu ....................... H04B 7/0613 370/329 |
| 2016/0192183 A1* | 6/2016 | Yamamoto ................ H02J 7/35 455/422.1 |
| 2017/0041205 A1* | 2/2017 | Rangel ................ H04L 41/0853 |
| 2017/0307378 A1* | 10/2017 | Bobye .................... G01S 19/54 |
| 2018/0299321 A1* | 10/2018 | Michaelis ................. G01P 5/00 |

FOREIGN PATENT DOCUMENTS

| | | |
|---|---|---|
| DE | 10242696 A1 | 9/2003 |
| DE | 102011015572 B3 | 6/2012 |
| DE | 19882702 B3 | 10/2012 |
| EP | 2804260 A1 | 11/2014 |
| EP | 2838158 A1 | 2/2015 |
| EP | 2894896 A1 | 7/2015 |
| EP | 2940791 A1 | 11/2015 |
| WO | 2014042444 A1 | 3/2014 |
| WO | 2014143678 A1 | 9/2014 |
| WO | 2015082000 A1 | 6/2015 |
| WO | 2015131835 A1 | 9/2015 |
| WO | 2015185802 A1 | 12/2015 |
| WO | 2016006779 A1 | 1/2016 |
| WO | 2016060294 A1 | 4/2016 |

OTHER PUBLICATIONS

Examination Report for European Patent Application No. 18706479. 5, dated May 31, 2021, 7 pages.
First Office Action for Chinese Patent Application No. 201880012513. 0, dated Sep. 24, 2020, 21 pages.
Second Office Action for Chinese Patent Application No. 201880012513. 0, dated Jul. 13, 2021, 15 pages.

* cited by examiner

| Temperature | | Power | | Beschleunigung | |
|---|---|---|---|---|---|
| Range | Frequency | Range | Frequency | Range | Frequency |
| -40°C bis +60°C | 1 | 0W bis 250 W | 1 | -5g bis +5g | 2 |
| -30°C bis +50°C | 10 | 50W bis 250W | 20 | -3g bis -2g | 500 |
| -25°C bis -20°C | 50 | 240W bis 250W | 5 | -1g bis +1g | 300000 |
| 10°C bis 60°C | 10 | 50W bis 80W | 10000 | | |
| 10°C bis 15 °C | 30000 | | | | |
| etc. | . | | | | |

ANTENNA, IN PARTICULAR MOBILE PHONE ANTENNA

CROSS-REFERENCE TO RELATED APPLICATIONS

The present application is a U.S. National Phase of International Patent Application Serial No. PCT/EP2018/053906 entitled "ANTENNA, IN PARTICULAR MOBILE RADIO ANTENNA," filed on Feb. 16, 2018. International Patent Application Serial No. PCT/EP2018/053906 claims priority to German Patent Application No. 10 2017 001 543.0 filed on Feb. 16, 2017. The entire contents of each of the above-referenced applications are hereby incorporated by reference for all purposes.

TECHNICAL FIELD

The present invention relates to an antenna having at least one emitter, a data acquisition unit, a memory and at least one sensor for detecting a mechanical and/or electrical and/or thermal stress on the antenna, the data acquisition unit storing measurement data determined by the sensor in the memory.

BACKGROUND AND SUMMARY

Such an antenna is known from U.S. Pat. No. 9,177,184 B2. The antenna has an RFID chip having a memory in which the data acquisition unit stores operating data of the antenna. The down-tilt angle of the individual frequency bands supported by the antenna is mechanically adjustable by a replaceable motor unit having an RFID reader for reading the data from the RFID chip. The operating data therefore in particular comprise configuration data for the down-tilt angles of the antenna, which are required by the motor unit. Furthermore, the RFID chip can be used as a logbook in which data on temperature changes, extreme temperatures, adjustment cycles and accelerations are stored.

Furthermore, a device near the antenna is known from DE 198 82 702 B3, which device has a test and monitoring function, which is performed periodically, and the results of which stored in a database of the device near the antenna and further communicated to a radio transmitter or receiver device.

Further antennas are known from U.S. Pat. Nos. 7,830,307 B2, 8,423,201 B2, 8,354,959 B2, 8,676,266 B2, 9,306,278 B2, US 2013127666 A1, U.S. Pat. No. 9,046,601 B2, WO 2014042444 A1, U.S. Pat. No. 9,276,329 B2, US 2014242930 A1, WO 2014143678 A9, U.S. Pat. No. 9,177,184 B2, EP 2804260 A1, U.S. Pat. Nos. 9,332,441 B2, 8,896,497 B1, 9,246,559 B2, US 2015034785 A1, EP 2838158 A1, WO 2015082000 A1, EP 2894896 A1, WO 2015131835 A1 and EP 2940791 A1.

The object of the present invention is to provide an improved antenna and an improved system and method for monitoring an antenna.

This object is achieved by the subject matter of the independent claims. Preferred embodiments of the present invention are the subject matter of the dependent claims.

The present invention comprises an antenna having at least one emitter, a data acquisition unit, a memory and having at least one sensor for detecting a mechanical and/or electrical and/or thermal stress of the antenna, wherein the data acquisition unit acquires measurement data of the at least one sensor and temporarily stores them in the memory.

Preferably, the antenna comprises a plurality of sensors for detecting the mechanical and/or electrical and/or thermal stress of the antenna, wherein the data acquisition unit acquires measurement data of the sensors and temporarily stores them in the memory. According to the invention, it is provided that the data acquisition unit generates data packets based on a plurality of measurement data stored in the memory and transmits them to an external database. The transmission of the data packets to the external database allows an evaluation of the measurement data, by which conclusions can be drawn on a change in the electrical and/or mechanical properties of the antenna and/or its service life. There is no need for constant communication with the external database due to the temporary storing of the measurement data and generating of the data packets based on a plurality of measurement data.

In particular, the antenna can be a mobile radio antenna, in particular an antenna for a mobile radio base station. However, the present invention can be used with any type of antenna.

In one possible embodiment of the present invention, the antenna comprises a plurality of emitters. Preferably, the emitters are arranged in a plurality of columns and/or rows and/or form one or more emitter arrays.

Preferably, at least one tilt angle of one or more emitter arrays is adjustable, preferably electrically adjustable, in particular via the adjustment of one or more phase shifters. Preferably, the one or more phase shifters are adjustable by means of an electric motor.

Preferably, the antenna has one or more ports for supplying the antenna with HF signals. Preferably, energy supply of components of the antenna is effected simultaneously via the ports, in particular an energy supply of an electric drive for adjusting a tilt angle and/or the data acquisition unit.

In one possible embodiment of the present invention, communication with one or more base stations can be effected via one or more ports.

Preferably, the external database and/or the communication of the data acquisition unit with the external database is independent of the base station(s) that supply the antenna with HF signals.

Preferably, the external database is assigned a plurality of antennas, which are arranged at different locations and/or assigned to different base stations.

Preferably, the data acquisition unit at least partially deletes the measurement data from the memory after the transmission of the data packets to the external database. The storage space requirements are reduced by at least partially deleting the data. Preferably, the measurement data is completely deleted.

In a preferred embodiment, the data acquisition unit performs the transmission of the data packets at predetermined intervals and/or on request by an external entity, in particular by the database.

In a first possible embodiment and/or a first operating mode, the data acquisition unit automatically initiates the transmission of the data packets.

In a second possible embodiment, a transmission of the data packets is initiated by the data acquisition unit receiving a corresponding request. In this case, the external entity can be configured, for example, in such a way that it polls all the antennas connected to the system in succession.

In one possible embodiment of the present invention, the data acquisition unit acquires the measurement data at a predetermined frequency. The predetermined frequency can be different for at least two sensors if a plurality of sensors are present. The frequency with which the data acquisition unit acquires the measurement data of a sensor can be constant or can vary, and in one possible embodiment depend on the acquired values and/or the variation of the acquired values. Preferably, the data acquisition unit acquires the measurement data of at least one and preferably several or all sensors at a frequency greater than 0.001 Hz, more preferably at a frequency greater than 0.01 Hz.

In one possible embodiment of the present invention, the transmission to the external database takes place at a predetermined interval of more than 1 minute. More preferably, the transmission takes place at a minimum interval of more than 10 minutes, more preferably of more than 30 minutes. The interval can be specified by the data acquisition unit and/or the external entity.

The interval at which the transmission occurs can be constant or vary, and in one possible embodiment, can depend on the acquired values and/or the variation of the acquired values and/or the number of stored values and/or the storage capacity still available.

Preferably, the interval in which a transmission of data packets takes place is greater than the interval at which measurement values are acquired.

In one possible embodiment of the present invention, the data acquisition unit generates the data packets based on a plurality of temporally successive measurement data. Preferably, the generation of the data packets takes place at least based on a plurality of temporally successive measurement data of the same sensor. Preferably, the data acquisition unit generates the data packets based on more than 10 consecutive measurement data, preferably based on more than 100 consecutive measurement data.

In one possible embodiment of the present invention, the data acquisition unit performs a data reduction of the acquired measurement data. This reduces the amount of data that has to be stored and/or transmitted.

Preferably, the data reduction includes an evaluation of the measurement data with regard to maximum values, minimum values and/or cycles. Alternatively or additionally, a spectrum can be generated, preferably a spectrum of maximum values, minimum values and/or cycles. More preferably, the data acquisition unit performs a division of the spectrum into bands. Preferably, the bands are defined and/or stored in the data acquisition unit. The data acquisition unit determines how many of the measurement values are present in one band. It is also possible to store measurement values which are composed of individual measurement points.

In one possible embodiment of the present invention, the data acquisition unit stores the measurement data in the memory sequentially. In particular, the data acquisition unit can acquire and store the measurement data at the predetermined frequency. The measurement data can be stored as unprocessed measurement values. Furthermore, it can be provided that all acquired measurement data are stored and/or the measurement data are stored at the same frequency with which they are acquired.

In one possible embodiment of the present invention, the data acquisition unit performs a data reduction of the measurement data stored in the memory to generate the data packets which are transmitted to the external database. According to the invention, therefore, the data packets are respectively processed by processing the stored data, which reduces the amount of data. In particular, the data reduction in this embodiment preferably takes place only when the data packets are generated from the stored data.

In an alternative embodiment of the present invention, the data acquisition unit stores the measurement data acquired at a predetermined frequency only after a data reduction has been performed. In particular, in one possible embodiment, prior to the storage of the measurement data, a processing of the acquired measurement data can take place, which reduces the amount of data. As a result, in certain embodiments, it is no longer necessary to store all acquired measurement data and/or to store the measurement data at the same frequency with which they are acquired. For example, it can be provided that the storage only takes place when a acquired measured value constitutes a maximum value, minimum value and/or cycle end. In this embodiment, the measurement values which are stored are therefore usually processed measurement values.

In one possible embodiment of the present invention, the antenna comprises a plurality of different sensors for detecting a mechanical and/or electrical and/or thermal stress on the antenna, the measurement data of which are temporarily stored in the memory. Preferably, in this case, the data packets transmitted by the data acquisition unit comprise measurement data from a plurality of sensors, which data packets are transmitted together to the external database. Preferably, the data are transmitted in the form of a matrix.

The antenna according to the present invention preferably comprises at least one and preferably a plurality of the following sensors, the measurement data of which are acquired by the data acquisition unit:

One or more sensors for measuring mechanical stress on the antenna structure. For example, such a sensor can comprise one or more strain gauges. Alternatively or additionally, an optical system can be provided. Furthermore, a load cell constructed from strain gauges can be used. Preferably, at least one sensor for measuring mechanical stress on a fastening element of the antenna is provided and/or assigned thereto, in particular a fastening element for fastening the antenna to a mast.

One or more acceleration sensors. These can be arranged on a measuring board. In particular, a plurality of acceleration sensors can be provided, which preferably detect all 6 degrees of freedom. In one possible embodiment, forces are derived from the accelerations.

One or more temperature sensors. In particular, at least one temperature sensor for measuring the temperature of a component of the antenna, which is heated by the operation of the antenna, can be provided. Preferably, the temperature sensor measures the temperature at an electronic component and/or a solder joint and/or a port of the antenna. Alternatively or additionally, at least one temperature sensor for measuring the temperature of the environment and/or the antenna structure can be provided. Preferably, a plurality of sensors is provided. The sensor(s) should be applied to one or more characteristic locations which provide information about the thermal stress of the antenna.

Determining the antenna power either by measurement by means of a sensor or by passive recording of the requested power. Preferably, the antenna power is individually measured and/or stored for each port of the antenna. The detection of the antenna power can take place, for example, by at least one directional coupler and/or by at least one temperature sensor. The power can also supply the existing electronics of the antenna.

In one possible embodiment, the antenna can further have one or more sensors for detecting the geographic position and/or for detecting the orientation of the antenna.

In one possible embodiment of the present invention, the data packets comprise, in addition to data generated from the measurement data, further antenna data. In particular, the further antenna data comprise at least one identifier, such as, for example, the serial number. Alternatively or additionally, the data packets can comprise geographic location data and/or antenna configuration data. The identifier is preferably used for the correct assignment of the data in the database.

In one possible embodiment of the present invention, the data acquisition unit acquires the measurement data during storage, transport and/or during operation of the antenna.

Preferably, the data acquisition unit acquires the measurement data at least during storage and/or transport. Also, the storage and transport have an influence on the state of the antenna and its service life, and thus can be considered according to the invention. More preferably, an acquisition of the measurement data also takes place during the operation of the antenna.

In one possible embodiment of the present invention, the measurement data are temporarily stored during storage and/or transport, and data packets generated based on these measurement data are transmitted to the external database only during or after commissioning. Therefore, no data transmission may take place during storage and/or transport.

In one possible embodiment of the present invention, the antenna has an autonomous power supply, in particular a storage for electrical energy, in particular a battery, a capacitor or an accumulator. Preferably, the autonomous power supply allows operation of the data acquisition unit during storage and/or transportation, that is, during periods in which the antenna is not powered by an external power supply.

In one possible embodiment, the autonomous power supply forms a separate element, which is connectable to a terminal of the antenna in order to supply the antenna with energy. Preferably, the autonomous power supply to a port of the antenna is connectable. As a result, no additional connections have to be provided on the antenna for the energy supply during storage and transport.

In a further embodiment, the autonomous power supply is installed in the antenna. In particular, an electrical energy store, in particular a capacitor, which supplies the data acquisition unit and/or sensor system with energy, is provided in the electronics of the antenna. This is charged before packaging. This has the advantage that there is no battery and the customer avoids associated transport problems, costs, garbage and errors.

In a preferred embodiment of the present invention, the data acquisition unit recognizes that there is no external power supply and, in this state, does not transmit data and/or change the parameters of the data acquisition. For example, the data acquisition unit can omit the acquisition and/or storage of measurement data on an electrical load and/or reduce the frequency at which measurement data is acquired for one or more sensors.

In one possible embodiment of the present invention, the antenna has a communication interface via which the data are transmitted to the external database. The communication interface can be configured wireless and/or wired. In one possible embodiment, the communication between the antenna and the database can take place via the Internet.

The present invention further comprises a system of a plurality of antennas as have been described above, a central external database and an evaluation unit.

Preferably, based on the data transmitted by the antennas, the evaluation unit determines a change in the electrical and/or mechanical properties and/or a damage value and/or a residual service life value of the antennas.

Alternatively or additionally, the evaluation unit determines changes in the position and orientation of the antennas based on the data transmitted by the antennas.

Alternatively or additionally, the evaluation unit determines data related to antenna location for the mechanical and/or electrical and/or thermal stress of the antennas based on the data transmitted by the antennas. This creates a database for locations worldwide. For example, data related to antenna location for vibration, power and/or ambient temperatures can be determined.

Preferably, for each antenna, the evaluation unit compares at least one value generated from the data packets transmitted by the antenna with a characteristic curve stored in the evaluation unit for the corresponding antenna type. In particular, the characteristic curve can be a fatigue characteristic curve. Preferably, a plurality of characteristic curves are stored in the evaluation unit. Preferably, at least one characteristic curve and preferably several characteristic curves are stored for each monitored antenna type.

In one possible embodiment of the present invention, the data packets transmitted by the antennas at predetermined intervals are collected in the database for the respective antennas. For this purpose, the database preferably comprises a memory section for each monitored antenna, in which memory section the data packets and/or data generated based on the data packets are collected. Preferably, the database comprises a corresponding database control.

In one possible embodiment of the present invention, the data transmitted by an antenna comprise a spectrum, which is preferably divided into bands, wherein the evaluation unit preferably adds the spectra transmitted at different times by the antenna in order to generate an overall spectrum. Furthermore, the evaluation can be carried out based on the entirety of the data packets transmitted by the antenna.

In one possible embodiment of the present invention, data generated from the measurement data of one or more sensors and transmitted by the antenna is converted by the evaluation unit into parameters for which one or more characteristic curves are stored in the evaluation unit. Preferably, the conversion is carried out by a transfer function.

For example, data relating to a measured acceleration and/or relating to measured forces can be converted into a wind load. A wind load profile of the location can be calculated therefrom.

Furthermore, the forces can be calculated based on the accelerations and the mass properties to determine damage to the antenna. Alternatively, a direct measurement of the forces is possible.

The present invention further comprises a method for monitoring at least one antenna, wherein the antenna has at least one emitter, a data acquisition unit, a memory and at least one sensor, wherein the data acquisition unit acquires measurement data determined by the sensor and stores it in the memory. According to the invention, it is provided that the data acquisition unit generates one or more data packets at predetermined intervals based on a plurality of measurement data stored in the memory and transmits them to the central database, wherein the transmitted data packets are collected in the database for the antenna and evaluated by the evaluation unit to monitor the antenna.

Preferably, a plurality of antennas are monitored. Furthermore, the antenna or antennas can be a mobile radio antenna, in particular a mobile radio antenna of a mobile radio base station.

Preferably, the evaluation unit determines a change in the electrical and/or mechanical properties and/or a damage value and/or a residual service life value of the antenna.

In particular, the evaluation unit can compare at least one value generated from the data packets transmitted by the antenna with a characteristic curve stored in the evaluation unit for the corresponding antenna type, which characteristic curve is preferably a fatigue characteristic curve and/or a correlation curve. In particular, it can be a correlation curve between acceleration and forces at the antenna, by which correlation curve forces are determined from the accelerations.

In one possible embodiment of the present invention, the data acquisition unit performs a data reduction of the acquired measurement data, wherein the data reduction preferably comprises an evaluation of the measurement data with respect to maximum values, minimum values and/or cycles and/or a generation of a spectrum, in particular a spectrum of maximum values, minimum values and/or cycles, wherein more preferably the spectrum is divided into bands.

Preferably, the method is carried out as already described in detail above with regard to the antenna according to the invention and/or the system according to the invention.

The method is a method for monitoring at least one antenna as described above. Alternatively or additionally, the method is carried out using a system as described in more detail above.

DETAILED DESCRIPTION OF FIGURES

The present invention is now described in more detail with reference to exemplary embodiments and figures.

Figure 2:
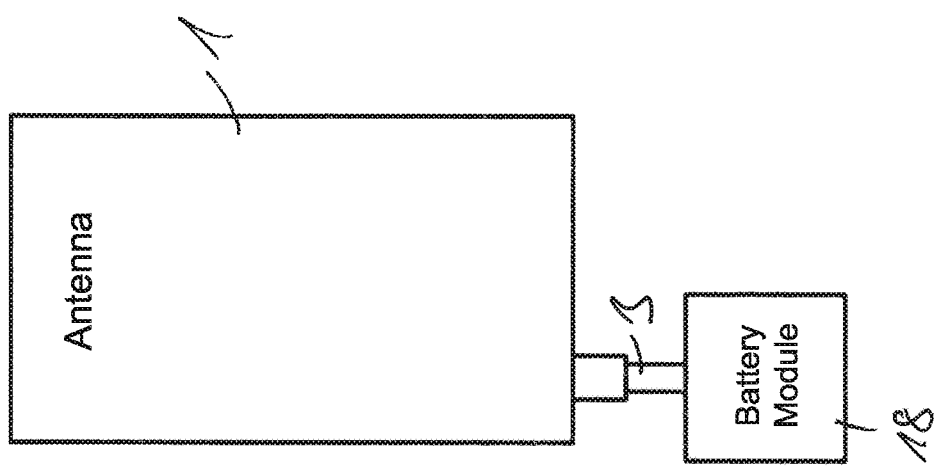
Figure 2:
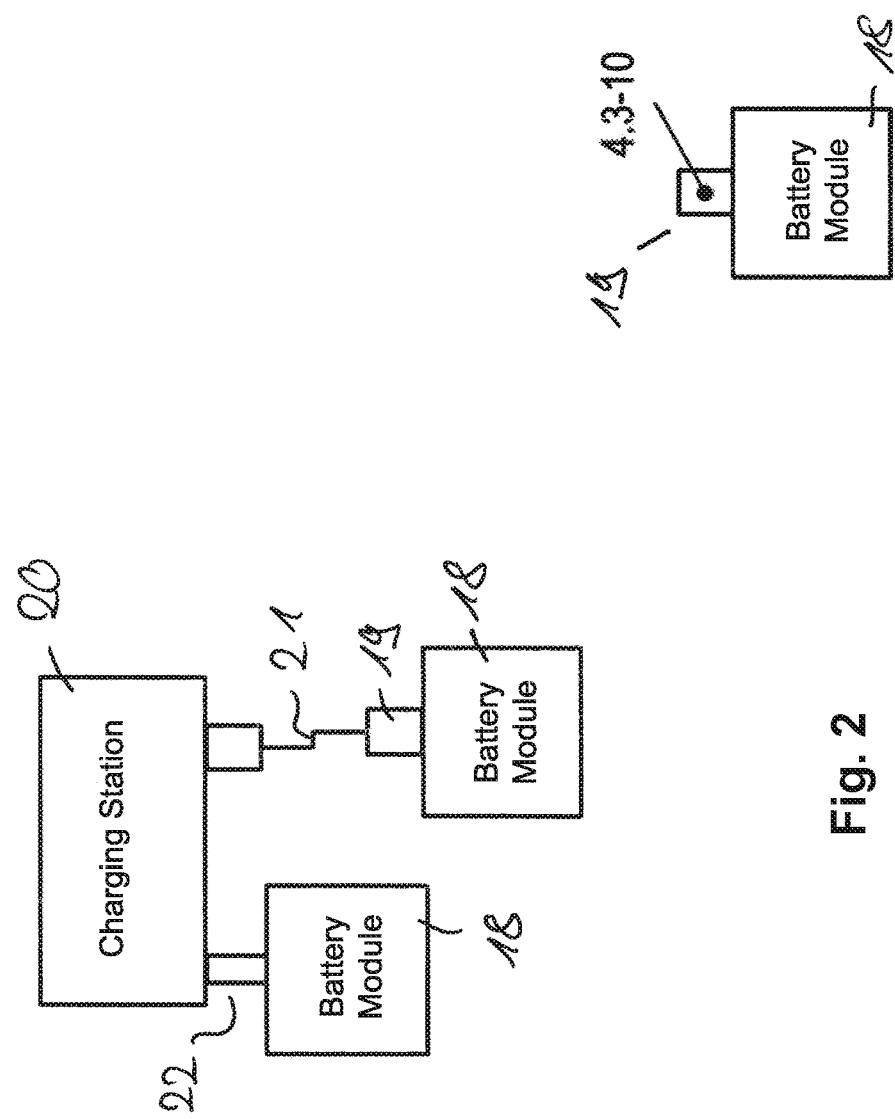
Figure 3:
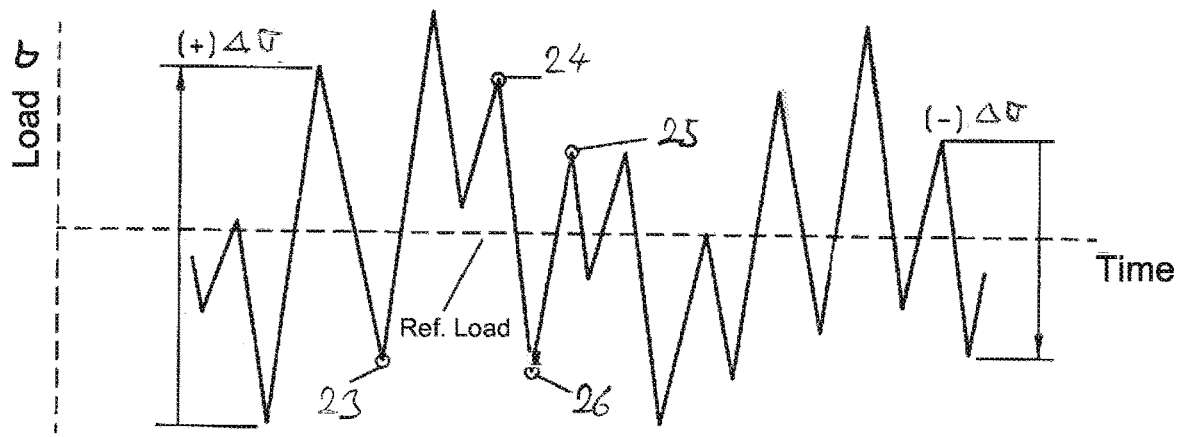
Figure 4:
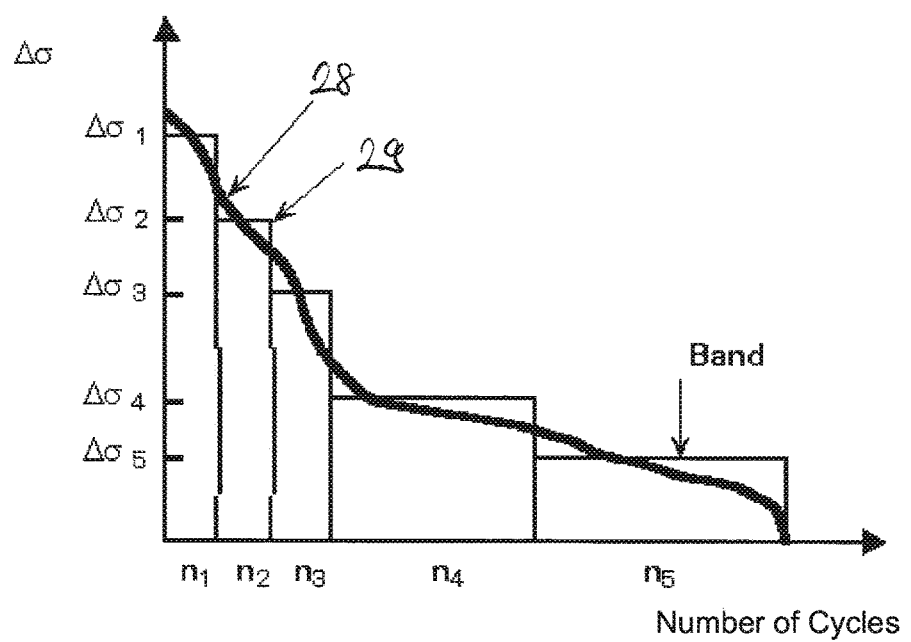
Figures 5, 6:
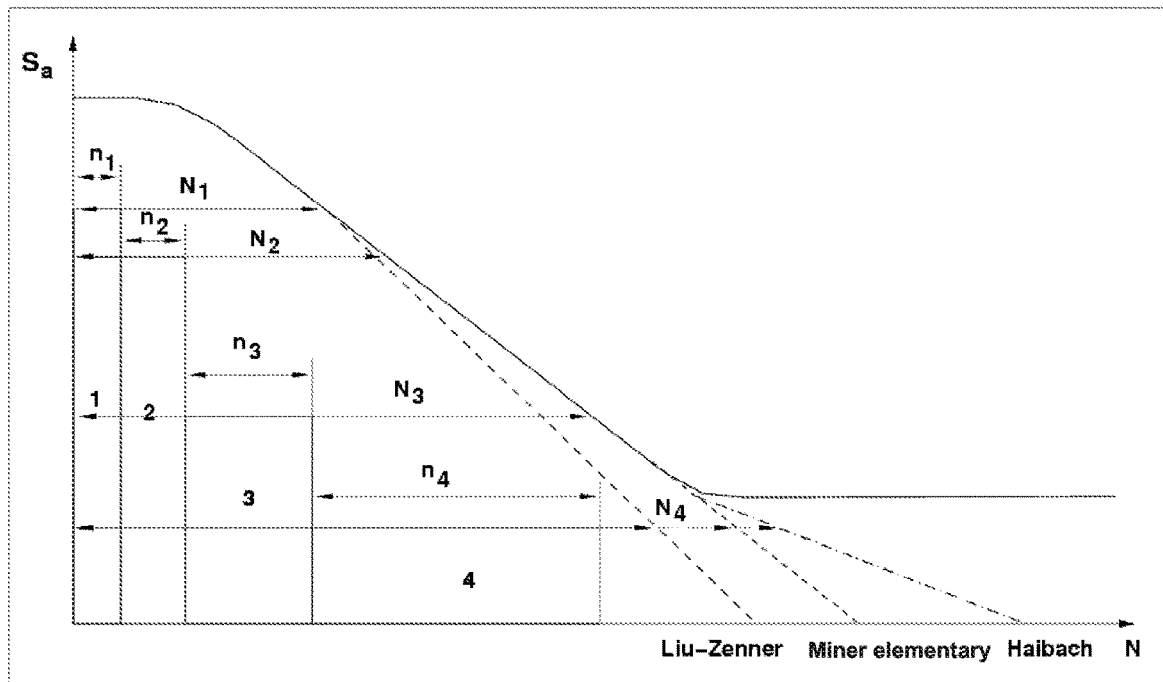

Shown are in:

FIG. 1—a first exemplary embodiment of a system according to the invention having an exemplary embodiment of an antenna according to the invention, FIG. 2—an exemplary embodiment for the power supply of the data acquisition unit of the antenna during transport and/or storage of the antenna, FIG. 3—a diagram describing a first step of data reduction performed by means of an exemplary embodiment of a data acquisition unit;

FIG. 4—a diagram describing a second step of data reduction performed by means of an exemplary embodiment of a data acquisition unit;

FIG. 5—an exemplary embodiment of a data matrix transmitted according to the invention having entries for the measurement values of a plurality of sensors, and FIG. 6—a diagram illustrating an evaluation by an exemplary embodiment of an evaluation unit according to the invention.

FIG. 1 shows an exemplary embodiment of an antenna according to the invention and of a system according to the invention.

The system according to the invention comprises an antenna 1, a database 16 and an evaluation unit 17, which are operated by an entity 15. The communication between the antenna 1 and the database 16 is preferably carried out through the cloud 14. The system typically comprises a plurality of antennas communicating with the database 16. The antennas are usually distributed on a plurality of locations.

In the exemplary embodiment, the antenna 1 is a mobile radio antenna for a mobile radio base station. The antenna has a housing (not shown in detail) and fastening elements for mechanical fastening, for example, to a mast.

The antenna has a plurality of emitters 2, of which only two emitters are shown schematically in FIG. 1. Preferably, the emitters are arranged in a plurality of columns and/or rows and form one or more emitter arrays. In this case, preferably at least the tilt angle of one or more emitter arrays is adjustable, in particular via the adjustment of one or more phase shifters, not shown. For this purpose, a drive 6 designated as FlexRet is provided in the exemplary embodiment, which adjusts the phase shifter by means of an electric motor.

The antenna has one or more ports 3 for supplying the emitters 2 with HF signals. In the exemplary embodiment, energy is supplied simultaneously via the ports to the components of the antenna, in particular a power supply of the electric drive 6 and/or the data acquisition unit 8. For this purpose, a signal separator is provided at the port 3, which separates a DC component applied to the port 3 from the HF signal and makes it available to the drive 6 and the data acquisition unit 8 via a line 5.

Furthermore, there can be communication with the base station and/or the system components via the port 3, for example, via AISG. For this purpose, the data acquisition unit 8 is functionally communicated to the port 3 via the OOK splitter 7. Alternatively or additionally, a communication with the system components can also take place via a wireless data communication unit 13. Preferably, the communication between the data acquisition unit 8 and the external database 16 is independent of the base station(s) that supply the antenna with HF signals.

According to the present invention, the antenna 1 has a data acquisition unit 8, a memory 8' and at least one sensor 9, 10, 11 for detecting a mechanical and/or electrical and/or thermal stress on the antenna. In this case, measurement values are recorded on or in the antenna, processed and, for example, transmitted via the cloud 14 to a database 16. Preferably, these data can be made available to third parties independent of the manufacturer of the base station and/or an OEM network supplier.

According to the invention, the transmission of sensor data in real time is avoided by temporarily storing the sensor data in the antenna 1. To reduce the amount of data to be transmitted, the sequential measurement data are reduced to a spectrum. The transmission of the data to the database 16 takes place according to a defined time interval and/or on request. In the database 16, the evaluation of the measurement values is carried out by an evaluation unit 17 for the purposes of third parties.

Preferably, the acquired and determined data enable the construction of a life cycle control system. For this purpose, the determined data of the antenna 1 are compared with the respective fatigue life curve of this antenna type, whereby a prediction of the service life of the antenna is possible. Furthermore, one can use this information for preventive maintenance measures such as antenna replacement. Furthermore, a database is created on the loads of the antennas at the respective locations, in particular worldwide. This can be used for dimensioning and/or optimizing the antennas and/or for defining the severity levels of the validation tests. It is also possible to draw conclusions about the network performance. The transmission and recording of software updates for the electronics in the antenna 1 is possible through the cloud 14.

In the context of the present invention, therefore, conclusions are drawn on the mechanical and electrical parameters of the antenna from the mechanical and/or electrical and/or thermal stress or the operating state of an antenna 1. For this purpose, there is initially a measurement and a preparation of values of the antenna, wherein the measurement is preferably carried out in the warehouse, during transport and in use. By comparison with empirical values such as a fatigue life curve, conclusions can be drawn about the changes in the electrical and mechanical properties of the antenna and its service life.

These variables must be acquired on or in the antenna for this. The acquired variables are collected in and at the antenna, processed in the antenna and temporarily stored in data packets in the antenna. The data packets are provided with the location data and antenna-inherent data, such as serial number, etc., so that the acquired variables can be assigned to the antennas and locations. These data packets are sent to an entity 15 outside the antenna, for example, via various services through a cloud 14. This entity 15 stores the data packets in a database 16 and further processes the data through an evaluation unit 17.

Specifically, in the embodiment, loads, accelerations, temperatures and/or the electrical power that is applied to the antenna are detected via sensors 9, 10, 11. Spectra are determined by a calculation software of the data acquisition unit 8 from the acquired measurement values. The data acquisition unit preferably comprises a microcontroller on which runs a software which implements the functions of the data acquisition unit. The measurement values and/or load spectra are temporarily stored in a memory 8' of the antenna. At a predetermined interval, data packets comprising the load spectra are provided with the location data and antenna-inherent data, such as serial number, etc., so that the acquired quantities can be assigned to the antennas and locations, and transmitted to the database 16.

An evaluation unit 17 makes a comparison with a mechanical, electrical and/or thermal service life or Wöhler curve, and a calculation of the material fatigue of mechanical, electrical and thermal quantities and their influence on the function of the antenna (electrical parameters). A Wöhler curve determined in the test, assuming a certain spectrum, which is stored in the evaluation unit, makes it possible to calculate the service life of the antenna. Conclusions can thus be made on the change or deterioration of the mechanical and electrical parameters of the antenna.

The specific embodiment of the individual components and steps according to the present invention are illustrated in more detail below with reference to the figures. The individual aspects can be achieved both independently of each other, and in combination:

Data Acquisition

The following values are acquired by sensor applications 9, 10, 11 in the antenna:

Application of strain gauges 11 on fastening elements of the antenna on the mast and on internal points. These positions are determined based on FEM analyses and the effectiveness of the signals is proven by means of a test. Load cells or calibrated structures such as fastening elements can also be used.

Application of accelerometers 9 on a suitable location or integrated into the board, which detects the accelerations of the antenna as best as possible.

Application of temperature sensors 10 on critical boards, solder joints or components and on the outside of the antenna; for example, phase shifters etc.

Detection of the antenna power by electronics or temperature measurement at suitable locations in the antenna A data acquisition unit 8 and the antenna monitoring unit (AMU) 12 with GPS sensor are additionally located in the antenna. The GPS sensor calculates the position of the location of the antenna. The data acquisition unit 8 and the AMU must not be located in the antenna, but can also be one or more externally mounted modules.

Control

A virtual CCU to control the individual sensors and their communication within the antenna is located in the AMU. The virtual CCU is software. The communication module (hardware) can also be located outside the antenna. It is then referred to as a ComModule. In the exemplary embodiment, the control functions are splitted as follows:

The data acquisition unit 8 processes the sensor data and bundles the data into packets and provides them.

The control of the data acquisition unit 8 and the external communication to the server is effected by the virtual CCU and/or the ComModule.

The power supply inside the antenna is provided by the FlexRet 6.

Data Generation

The following sensors/sensor types can be used, for example:

| Parameter | Place | Measurement signal |
| --- | --- | --- |
| Temperature PT100 | Installed on the measuring board or with cable in a hot spot | Ohm, ° C. |
| Antenna power | Detecting the power of each port with directional coupler. | Volts, amps, watts |
| Acceleration | Installed on the measurement board when placed close to a mast mount | pF |
| Antenna power | Ports, phase shifters | ° C. |

The antenna power can also be detected by logging the requested power.

Data Storage

The data are acquired using a frequency to be determined and stored in the data acquisition unit 8.

Temperature: between 0.01 Hz and 1 Hz; for example, about 0.1 Hz

Antenna power: between 0.01 Hz and 1 Hz; for example, about 0.1 Hz

Acceleration: between 10 Hz and 10,000 Hz; for example, about 1,000 Hz

Depending on the memory size, the data acquisition time is, for example, 1 h to 1 week or 1 month.

If the memory is filled to a predetermined value, the data stored as a sequence are compressed into a spectrum and added and stored in a matrix. Exemplary values for such a matrix are illustrated in FIG. 5. The frequency of values in the matrix increases over time.

Only the amount of data of the spectrum which is substantially reduced with respect to the measured sequence is transferred to the database 16 via the cloud.

Spectrum Creation

The creation of a spectrum is illustrated in more detail with reference to FIG. 3 and FIG. 4:

The measurement data are first acquired sequentially. Since this amount of data is much too large for a data transfer, it must be characteristically compressed. For this purpose, minima 23, 26 and maxima 24, 25 and cycles or half-cycles therefrom are first determined from the sequential measurement data. The cycles correspond in each case to a load change $\Delta\sigma$. Preferably, cycles are selected according to a predetermined rule. The selection and determination of the cycles preferably takes place according to the Rainflow method.

A real spectrum 28 of such load changes $\Delta\sigma$ is shown in FIG. 4. According to a given reasonable gradation $\Delta\sigma_1$ to $\Delta\sigma_5$, the cycles are sorted into a plurality of bands having a predetermined bandwidth, and the number $n_1$ to $n_5$ of the cycles per band in the matrix described above is added for a period to be defined. The spectrum is calculated by a microcontroller internal to the antenna.

Data Transmission

The data acquisition unit 8 bundles the data into packets and provides them.

The control of the data acquisition unit 8 and the communication to the outside of the server is effected by the virtual CCU and/or the ComModule.

The transmission of the data, in particular the content of the matrix together with the antenna-specific data such as serial number, takes place at a fixed, repetitive point of time. After the data transmission, the sequential measurement data and the content of the matrix in the data acquisition unit 8 are deleted.

The virtual CCU controls the time of data acquisition and its transfer to the server in the entity. The deletion of the transmitted data in the memory of the data acquisition unit 8 is also controlled by the virtual CCU.

Database/Evaluation Unit

A file is created for each antenna in the database, in which database the data of the antenna such as name, location, azimuth, etc. are stored. The individual matrices are stored ordered by sending date in this file. In addition, the data of the individual matrices are added into a total matrix of this antenna.

A fatigue characteristic curve determined from tests is stored for each type of antenna, preferably for the following values:

Temperature
Performance
Wind load/Vibration

The temperature fatigue and the performance fatigue can, for example, according to Miner rule, be calculated directly from the acquired spectrum and the fatigue characteristic curve. However, there are other methods.

The measured acceleration and/or the measured forces can be converted by means of a transfer function into a wind load. The basis for this are tests which determine a correlation between the signal of the acceleration and/or force sensors and the wind load/vibration. It is then possible to calculate structural fatigue therefrom for defined locations in the antenna and/or determine location-dependent wind loads.

The calculation of the service life is preferably carried out according to the method of linear damage accumulation, which is illustrated in FIG. 6. To calculate the service life, the amplitude collective is divided (stepped) into individual rectangular collectives having constant amplitude $S_a$ and a partial load cycle number $n_i$. According to the method of linear damage accumulation, a partial damage is calculated for each partial collective by dividing the partial load cycle number by the maximum sustainable number of load cycles $N_i$ at $S_a$ the service life characteristic curve. The partial damages of all partial collectives are summed up and result in the total damage D of the component.

$$D = \sum \frac{n_i}{N_i}$$

If the damage exceeds the value 1, a break or crack in the component, a thermal failure or a performance failure is to be expected under the considered load collective. For example, a characteristic curve according to Liu-Zenner, Miner or Halbach can be used as the service life characteristic curve, which are shown in more detail in FIG. 6.

Power Supply of the Electronics

In order to be able to acquire data also during the storage, transport and installation of the antenna, which data suggest the handling of the antenna in this phase, the electronics in the antenna should be supplied with power by an additional battery module and/or one or more capacitors.

The battery module is plugged onto a port on the antenna, supplying power to the electronics in the antenna. The interface is a 4.3-10 Kenya plug. On the one hand, the battery is charged via the plug before application to the antenna and, on the other hand, the sensors and data storage and processing are supplied with energy in the state plugged into the antenna.

After mounting the antenna, the battery module should be sent back to the manufacturer for reuse. The battery module is part of the packaging.

Alternatively or additionally, the antenna can have a built-in energy storage, for example, a capacitor, which is charged before delivery.

If the battery module is connected and/or the antenna is disconnected from the external power supply, this is recognized by the electronics in the antenna, the AMU does not transmit the data to the outside. The sensor data continues to be processed and temporarily stored in the AMU and/or in the collector unit/data dispatcher. If the antenna is set up, the battery module is removed and supplied with current via the Flexret, the collected and compressed data of the memory is sent.

Advantages of the Solution According to the Invention

From antenna manufacturers, OEM network suppliers and third-party independent data management for network operators.

Network operator can decide which third parties (for example, OEM, antenna manufacturers, service providers) can access antenna data that is stored in the cloud.

Data can be used for site mapping and SON applications and can be managed in a centralized manner.

Conclusions can be drawn about antenna parameters from the mechanical and thermal stress of the antenna.

Generation of a comprehensive database about the location and the mechanical, thermal and electrical load. This is the basis for future antenna developments.

The manufacturer can generate and offer service applications, for example, offer or perform the exchange by monitoring antenna parameters before, for example, mechanical failures and VSWR alarms occur.

The invention claimed is:

1. An antenna, wherein the antenna is for a mobile radio base station, and the antenna comprising:
   at least one emitter,
   a memory,
   at least one sensor for detecting a mechanical and/or electrical and/or thermal stress of the antenna, and
   a data acquisition unit configured to:
      acquire measurement data of the at least one sensor and temporarily store the acquired measurement data in the memory, generate data packets based on the acquired measurement data stored in the memory, and
      transmit the data packets to an external database;
   wherein the data acquisition unit performs a data reduction of the acquired measurement data, wherein the data reduction comprises an evaluation of the acquired measurement data of the at least one sensor with respect to maximum values, minimum values, and cycles and a generation of a spectrum of the maximum values, the minimum values, and the cycles, wherein the spectrum is divided into bands.

2. The antenna according to claim 1, wherein the data acquisition unit at least partially deletes the acquired measurement data stored in the memory after transmitting the data packets to the external database.

3. The antenna according to claim 1, wherein the data acquisition unit is further configured to:
transmit the data packets at predetermined intervals and/or on request by an external entity, and/or acquire the measurement data of the at least one sensor at a predefined frequency, and/or transmit to the external database at a predefined interval of more than 1 minute, and/or generate the data packets based on a plurality of temporally successive measurement data.

4. The antenna according to claim 3, wherein the data acquisition unit acquires the measurement data of the at least one sensor at a frequency greater than 0.001 Hz, and wherein the transmission of the data packets to the external database takes place at a predefined interval of more than 10 minutes, and/or wherein the data acquisition unit generates the data packets based on a plurality of temporally successive measurement data of a same sensor, and wherein the data acquisition unit generates the data packets based on more than 10 consecutive measurement data.

5. The antenna according to claim 1, wherein the data acquisition unit performs the data reduction of the acquired measurement data stored in the memory to generate the data packets which are transmitted to the external database, and/or wherein the data acquisition unit stores the acquired measurement data acquired at a predetermined frequency only after the data reduction of the acquired measurement data has been performed.

6. The antenna according to claim 1, wherein:
the at least one sensor comprises a plurality of different sensors for detecting the mechanical and/or electrical and/or thermal stress on the antenna,
the measurement data acquired by the data acquisition unit are temporarily stored in the memory, and
the data packets transmitted by the data acquisition unit comprise the acquired measurement data from the plurality of different sensors, and the acquired measurement data are transmitted together to the external database in a form of a matrix.

7. The antenna according to claim 1, wherein the antenna comprises the at least one sensor, and the at least one sensor is at least one of the following sensors:
one or more sensors for measuring mechanical loads of the antenna,
one or more acceleration sensors,
one or more temperature sensors, and
one or more sensors for detecting antenna power.

8. The antenna according to claim 7, wherein the at least one sensor is provided on a fastening element of the antenna for fastening the antenna to a mast; wherein the one or more acceleration sensors are provided which detect all 6 degrees of freedom; wherein the one or more temperature sensors for measuring temperature of a component of the antenna, which is heated by operation of the antenna, is provided at an electronic component and/or a solder joint and/or a port of the antenna, and/or wherein the one or more temperature sensors for measuring temperature of an environment and/or the antenna is provided; wherein the antenna power is individually measured and/or stored for each port of a plurality of ports of the antenna, and/or wherein the one or more sensors for detecting the antenna power takes place by at least one directional coupler and/or by the one or more temperature sensors and/or wherein the one or more sensors for detecting the antenna power takes place by passive recording of requested power.

9. The antenna according to claim 1, wherein the data packets further comprise antenna data, wherein the antenna data includes at least one identifier and/or geographic location data and/or data on an orientation of the antenna and/or antenna configuration data.

10. The antenna according to claim 1, wherein the data acquisition unit is further configured to acquire the measurement data of the at least one sensor during storage, transport and/or during operation, wherein the antenna temporarily stores the acquired measurement data during the storage and/or the transport, and transmits the data packets generated based on the acquired measurement data to the external database only during or after commissioning.

11. The antenna according to claim 10, wherein the antenna comprises an autonomous energy supply for electrical energy, wherein the autonomous energy supply forms a separate element, which is connectable to a terminal of the antenna in order to supply the antenna with energy, wherein the autonomous energy supply is connectable to a port of the antenna, and/or wherein the autonomous energy supply is integrated into the antenna, and/or wherein the data acquisition unit recognizes a connected autonomous energy supply and/or recognizes that there is no external energy supply, and does not transmit data and/or change parameters of the data acquisition unit.

12. The antenna according to claim 11, wherein the autonomous energy supply is a battery, capacitor or an accumulator.

13. A method for monitoring at least one antenna for a mobile radio base station, the at least one antenna comprising:
at least one emitter,
a memory,
at least one sensor for detecting a mechanical and/or electrical and/or thermal stress of the at least one antenna, and
a data acquisition unit configured to:
acquire measurement data of the at least one sensor and temporarily store the acquired measurement data in the memory, generate one or more data packets based on the acquired measurement data stored in the memory, and
transmit the one or more data packets to a central database, wherein the one or more transmitted data packets are collected in the central database for the at least one antenna and evaluated by an evaluation unit to monitor the at least one antenna;
wherein the data acquisition unit performs a data reduction of the acquired measurement data, wherein the data reduction comprises an evaluation of the acquired measurement data of the at least one sensor with respect to maximum values, minimum values, and cycles and a generation of a spectrum of the maximum values, the minimum values, and the cycles, wherein the spectrum is divided into bands.

14. The method according to claim 13, wherein the evaluation unit determines a change in electrical and/or mechanical properties and/or a damage value and/or a residual service life value of the at least one antenna, wherein the evaluation unit compares at least one value generated from the one or more data packets transmitted by the at least one antenna with a characteristic curve stored in the evaluation unit for a corresponding antenna type, wherein the characteristic curve is a fatigue characteristic curve, and/or wherein, on a basis of an evaluation by the evaluation unit, preventive measures for maintenance and/or for replacement of antennas are taken.

15. The method according to claim 13, wherein the data acquisition unit performs the transmission of the one or more data packets at predetermined intervals and/or upon request by an external entity.

* * * * *